(12) United States Patent
Guo et al.

(10) Patent No.: US 9,819,856 B2
(45) Date of Patent: Nov. 14, 2017

(54) SHOOTING PARAMETER ADJUSTMENT METHOD AND DEVICE

(71) Applicant: Xiaomi Inc., Beijing (CN)

(72) Inventors: Chong Guo, Beijing (CN); Ling Zhu, Beijing (CN); Xiaolong Chen, Beijing (CN); Xiaowei Hu, Beijing (CN); Haipo Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/993,249

(22) Filed: Jan. 12, 2016

(65) Prior Publication Data

US 2016/0127638 A1 May 5, 2016

Related U.S. Application Data

(63) Continuation of application No. PCT/CN2014/091759, filed on Nov. 20, 2014.

(30) Foreign Application Priority Data

Jul. 18, 2014 (CN) .......................... 2014 1 0345545

(51) Int. Cl.
*H04N 5/232* (2006.01)
*G06F 3/0484* (2013.01)
(Continued)

(52) U.S. Cl.
CPC ..... *H04N 5/23216* (2013.01); *G06F 3/04847* (2013.01); *G06F 3/04883* (2013.01); *H04N 5/23293* (2013.01); *H04N 5/238* (2013.01); *H04N 5/2353* (2013.01); *H04N 5/23212* (2013.01)

(58) Field of Classification Search
None
See application file for complete search history.

(56) References Cited

U.S. PATENT DOCUMENTS

2009/0015703 A1  1/2009 Kim et al.
2009/0153527 A1  6/2009 Paczkowski
(Continued)

FOREIGN PATENT DOCUMENTS

CN   102004601 A   4/2011
CN   102457661 A   5/2012
(Continued)

OTHER PUBLICATIONS https://www.youtube.com/watch?v=tRut1f3Zlj0, Nokia Lumia 1020 Full camera review, Sep. 13, 2013.*
(Continued)

*Primary Examiner* — James Hannett
(74) *Attorney, Agent, or Firm* — Finnegan, Henderson, Farabow, Garrett & Dunner LLP

(57) ABSTRACT

A method for a device to adjust a shooting parameter, includes: receiving a click signal triggered from a viewfinder displayed on a touchscreen; displaying, by taking a click position indicated by the click signal as a reference position, an adjusting control corresponding to a shooting parameter; receiving a sliding touch signal indicating a sliding touch operation on the adjusting control; and adjusting the shooting parameter according to the sliding touch signal.

17 Claims, 20 Drawing Sheets

(51) Int. Cl.
    *G06F 3/0488*  (2013.01)
    *H04N 5/235*   (2006.01)
    *H04N 5/238*   (2006.01)

(56) References Cited

U.S. PATENT DOCUMENTS

| | | | |
|---|---|---|---|
| 2010/0156941 A1 | 6/2010 | Seung | |
| 2011/0019058 A1 | 1/2011 | Sakai et al. | |
| 2011/0109581 A1 | 5/2011 | Ozawa et al. | |
| 2013/0335379 A1* | 12/2013 | Sharma | G06F 1/1639 345/175 |

FOREIGN PATENT DOCUMENTS

| | | |
|---|---|---|
| CN | 102971697 A | 3/2013 |
| CN | 103209291 A | 7/2013 |
| CN | 103558970 A | 2/2014 |
| CN | 103559717 A | 2/2014 |
| CN | 103713809 A | 4/2014 |
| CN | 103869951 A | 6/2014 |
| CN | 104156149 A | 11/2014 |
| JP | 11-212726 A | 8/1999 |
| JP | 2001159730 A | 6/2001 |
| JP | 2002365519 A | 12/2002 |
| JP | 2007019685 A | 1/2007 |
| JP | 2010003307 A | 1/2010 |
| JP | 2010204844 A | 9/2010 |
| JP | 2011028345 A | 2/2011 |
| JP | 2011112717 A | 6/2011 |
| JP | 2013037556 A | 2/2013 |
| JP | 2013162419 A | 8/2013 |
| KR | 20120027516 A | 3/2012 |
| WO | WO 2016/008246 A1 | 1/2016 |

OTHER PUBLICATIONS

International Search Report of PCT/CN2014/091759, from the State Intellectual Property Office of China, mailed Apr. 17, 2015.

Extended Search Report for European Application No. 15177086.4 from the European Patent Office, dated Nov. 24, 2015.

Klug, B., "Nokia Announces Lumia 1020—41 MP PureView and Windows Phone (Update: Hands On and Video)", Jul. 11, 2013, retrieved from http://ww.anandtech.com/show/7140/nokia-announces-lumina-1020-.

English version of International Search Report of PCT/CN2014/091759, from the State Intellectual Property Office of China, mailed Apr. 17, 2015.

* cited by examiner

SHOOTING PARAMETER ADJUSTMENT METHOD AND DEVICE

CROSS-REFERENCE TO RELATED APPLICATIONS

This application is a Continuation Application of International Application No. PCT/CN2014/091759, filed Nov. 20, 2014, which is based on and claims priority to Chinese Patent Application No. 201410345545.6, filed Jul. 18, 2014, the entire contents of all of which are incorporated herein by reference.

TECHNICAL FIELD

The present disclosure generally relates to the field of image processing and, more particularly, to a shooting parameter adjustment method and a device thereof.

BACKGROUND

Electronic devices with touch screens, such as smart mobile phones, tablet PCs, and the like, may include functions of shooting pictures or recording videos. In the process of shooting pictures or recording videos, a touchscreen of an electronic device can be used to adjust shooting parameters. For example, the electronic device displays a plurality of buttons on the touchscreen, such as a shooting mode selection button, an exposure control button, a white balance control button, etc. When a user wishes to adjust a shooting parameter, the user may click on a corresponding button to trigger display of a corresponding drop-down menu, and then select or adjust the shooting parameter from the drop-down menu.

SUMMARY

According to a first aspect of the present disclosure, there is provided a method for a device to adjust a shooting parameter, comprising: receiving a click signal triggered from a viewfinder displayed on a touchscreen; displaying, by taking a click position indicated by the click signal as a reference position, an adjusting control corresponding to a shooting parameter; receiving a sliding touch signal indicating a sliding touch operation on the adjusting control; and adjusting the shooting parameter according to the sliding touch signal.

According to a second aspect of the present disclosure, there is provided a device, comprising: a processor; a touchscreen; and a memory for storing instructions executed by the processor; wherein the processor is configured to: receive a click signal triggered from a viewfinder displayed on a touchscreen; display, by taking a click position indicated by the click signal as a reference position, an adjusting control corresponding to a shooting parameter; receive a sliding touch signal indicating a sliding touch operation on the adjusting control; and adjust the shooting parameter according to the sliding touch signal.

According to a third aspect of the present disclosure, there is provided a non-transitory computer-readable storage medium having stored therein instructions that, when executed by a processor of a device, cause the device to perform a method for adjusting a shooting parameter, the method comprising: receiving a click signal triggered from a viewfinder displayed on a touchscreen; displaying, by taking a click position indicated by the click signal as a reference position, an adjusting control corresponding to a shooting parameter; receiving a sliding touch signal indicating a sliding touch operation on the adjusting control; and adjusting the shooting parameter according to the sliding touch signal.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Specific embodiments of the present disclosure are shown by the above drawings, and more detailed description will be made hereinafter. These drawings and text description are not for limiting the scope of conceiving the present disclosure in any way, but for illustrating the concept of the present disclosure for those skilled in the art by referring to specific embodiments.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In exemplary embodiments described below, there are provided shooting parameter adjustment methods for use in an electronic device with a touchscreen and an imaging function such as taking pictures and/or recording videos. For example, the electronic device may be a mobile phone, a tablet computer, an ebook reader, a Moving Picture Experts Group Audio Layer III (MP3) player, a Moving Picture Experts Group Audio Layer IV (MP4) player, a laptop computer, a desktop computer and the like.

Figure 1A:
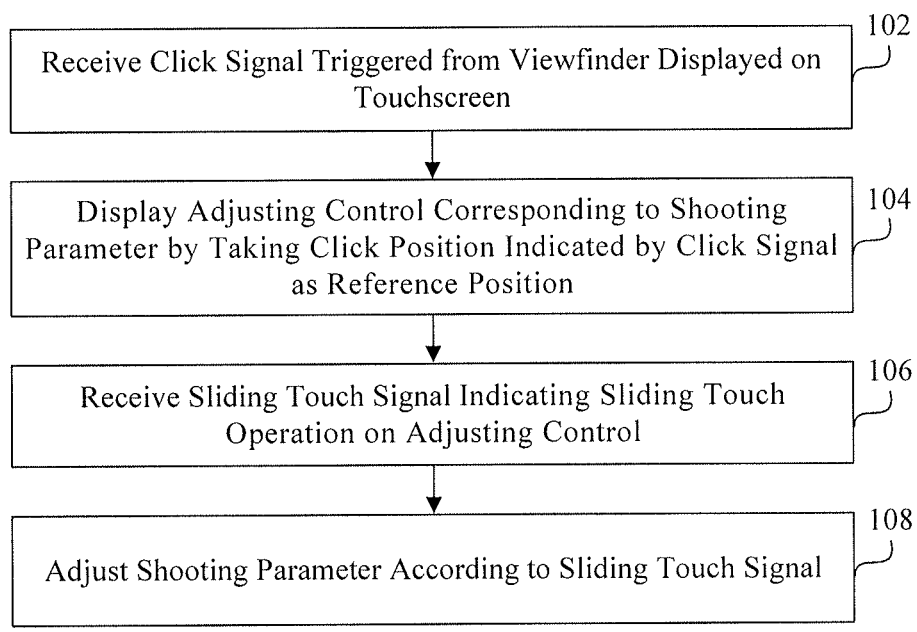
FIG. 1A is a flow chart of a shooting parameter adjustment method, according to an exemplary embodiment.

FIG. 1A is a flow chart of a shooting parameter adjustment method 100 for use in an electronic device, according to an exemplary embodiment. For example, the electronic device has a touchscreen and an imaging function such as taking pictures and/or recording videos. Referring to FIG. 1, the method 100 includes the following steps.

In step 102, the electronic device receives a click signal triggered from a viewfinder displayed on the touchscreen.

In step 104, the electronic device displays an adjusting control corresponding to a shooting parameter by taking a click position indicated by the click signal as a reference position. For example, the adjusting control can be a rotator adjusting control displayed as any one of a complete circle, an incomplete circle, a complete ring, and an incomplete ring.

In step 106, the electronic device receives a sliding touch signal indicating a sliding touch operation on the adjusting control.

In step 108, the electronic device adjusts the shooting parameter according to the sliding touch signal.

By using the method 100, the efficiency of adjusting a shooting parameter is improved.

Figure 1B:
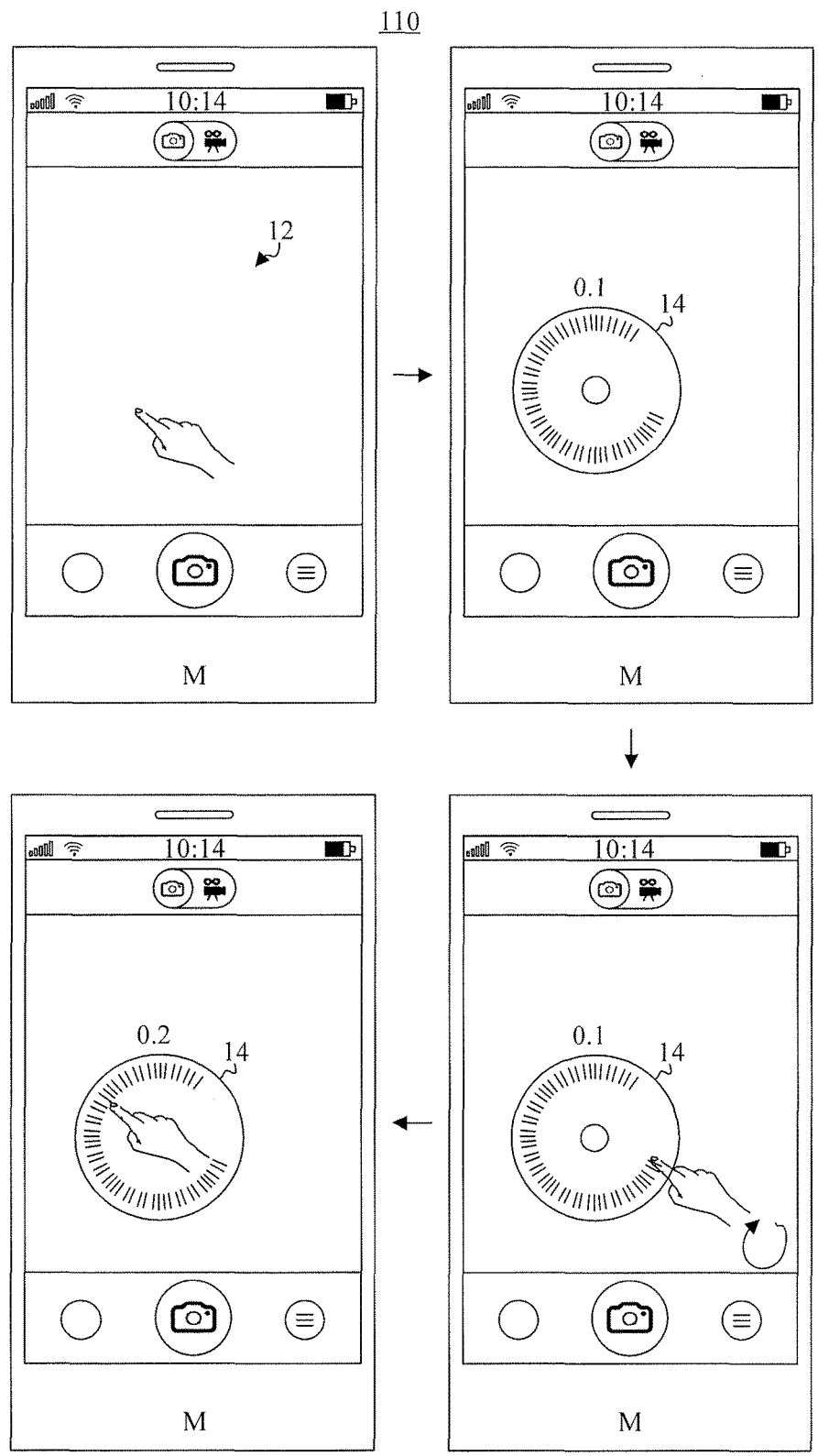
FIG. 1B shows schematic diagrams of a process for adjusting a shooting parameter, according to an exemplary embodiment.

FIG. 1B shows schematic diagrams of a shooting process 110 based on the method 100 (FIG. 1A), according to an exemplary embodiment. Referring to FIG. 1B, a user clicks on a position in a viewfinder 12, e.g., to select an object to be photographed. Accordingly, the electronic device generates a click signal and displays, by taking the click position indicated by the click signal as a reference position, an adjusting control 14 corresponding to a shooting parameter, e.g., exposure compensation. In the illustrated embodiment, the adjusting control 14 is a rotator adjusting control displayed as a circle with the click position being a circle center. The user may adjust the rotator adjusting control 14 by a clockwise sliding touch operation or an anticlockwise sliding touch operation, thus adjusting the shooting parameter. For example, the clockwise sliding touch operation increases an exposure compensation value from 0.1 to 0.2.

Figure 1C:
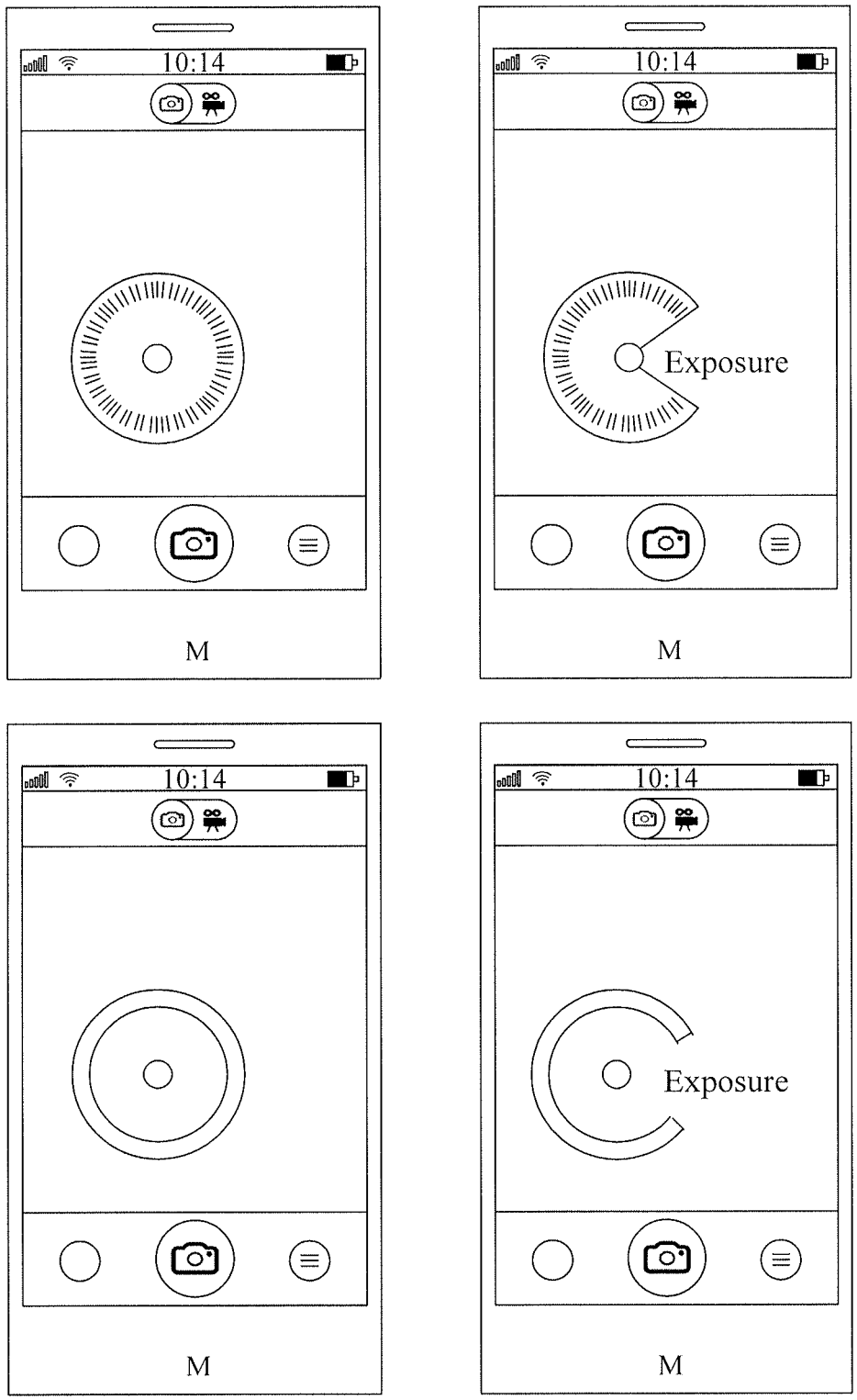
FIG. 1C shows schematic diagrams of an adjusting control, according to an exemplary embodiment.

In the illustrated embodiment, the adjusting control 14 is configured to generate a sliding touch signal indicating a sliding touch operation along a curve on the touchscreen. As a result, the electronic device receives the sliding touch signal and adjusts the shooting parameter according to the sliding touch signal. A display shape of the adjusting control 14 includes but is not limited to: a complete circle, an incomplete circle, a complete ring or an incomplete ring, as shown in FIG. 1C.

In exemplary embodiments, the shooting parameter can be any one of an exposure compensation value, a white balance value, an International Standards Organization (ISO) setting (also known as a sensitivity setting), an aperture value, a focal length, and a shutter speed.

Figure 2A:
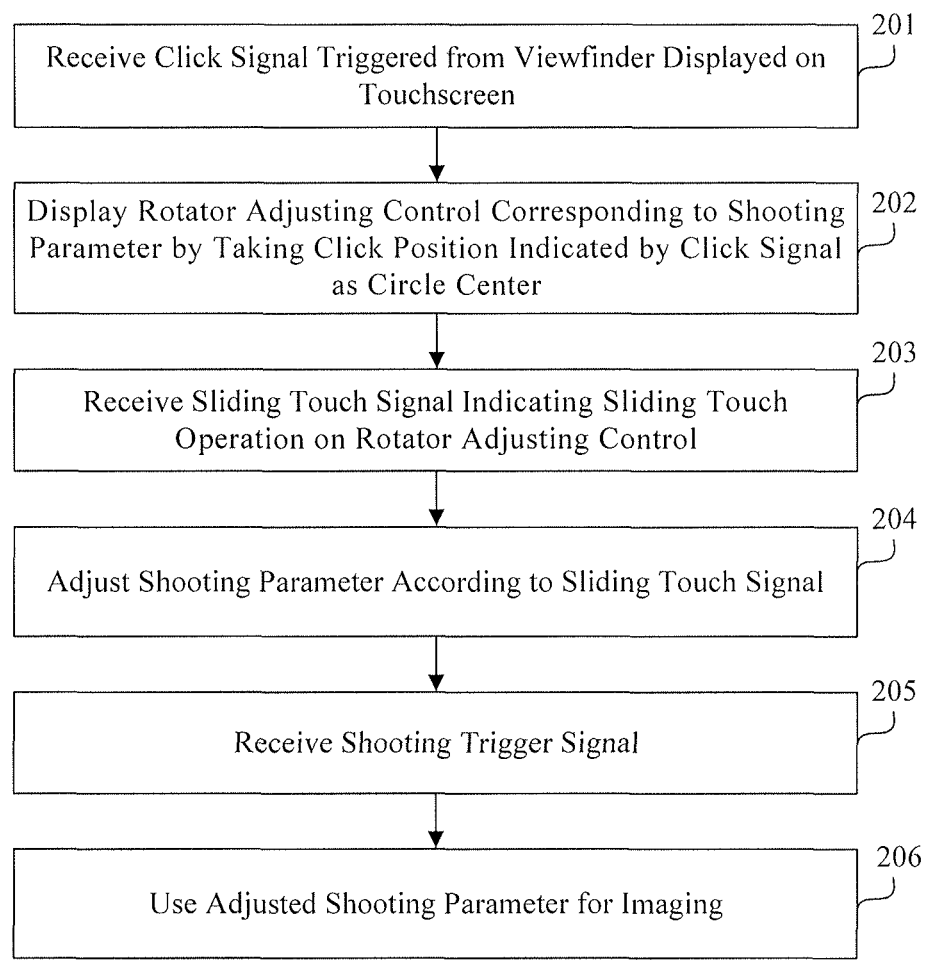
FIG. 2A is a flow chart of a shooting parameter adjustment method, according to an exemplary embodiment.

FIG. 2A is a flow chart of a shooting parameter adjustment method 200 for use in an electronic device, according to an exemplary embodiment. For example, the electronic device has a touchscreen and an imaging function such as taking pictures and/or recording videos. Referring to FIG. 2A, the method 200 includes the following steps.

In step 201, the electronic device receives a click signal triggered from a viewfinder displayed on the touchscreen.

For example, when a user uses the electronic device to take a picture or record a video, the electronic device displays the viewfinder on the touchscreen for preview. The click signal is triggered when the user clicks on a position in the viewfinder displayed on the touchscreen. The electronic device may take the click position indicated by the click signal as a focus position and perform automatic focusing.

In step 202, the electronic device displays a rotator adjusting control corresponding to a shooting parameter by taking the click position indicated by the click signal as a circle center. For example, the rotator adjusting control may be displayed as a complete ring which includes a scale identification corresponding to the shooting parameter.

Figure 2B:
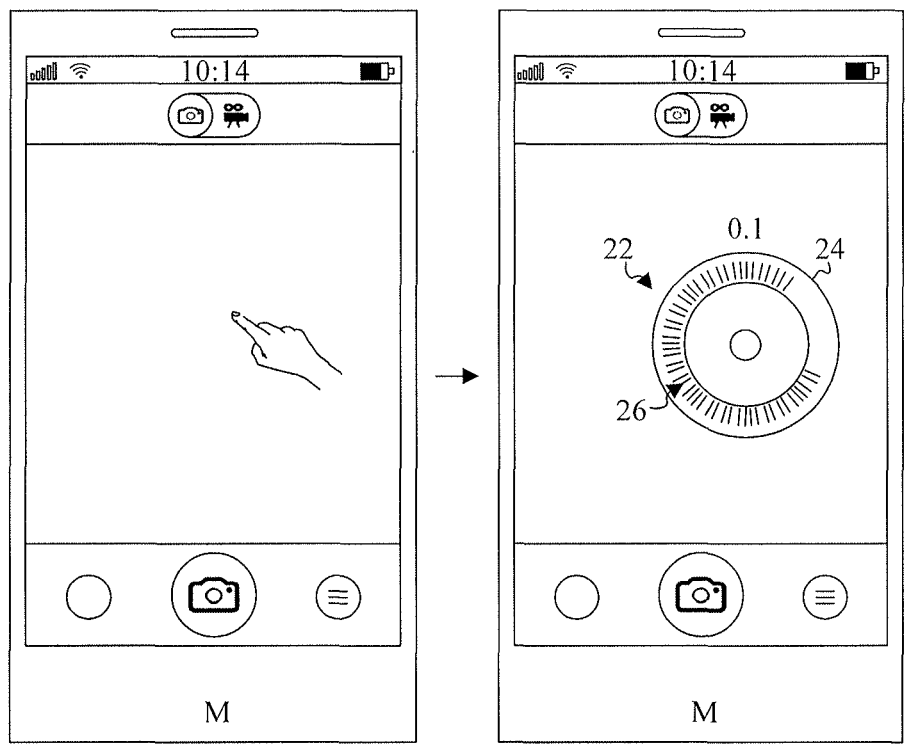
FIG. 2B shows a schematic diagram of a rotator adjusting control, according to an exemplary embodiment.

For example, as shown in FIG. 2B, the shooting parameter is an exposure compensation value, and a rotator adjusting control 22 is used to adjust the exposure compensation value. The rotator adjusting control 22 is displayed as a complete ring 24, on which scale identifications 26 corresponding to different exposure compensation values are equally distributed.

In step 203, the electronic device receives a sliding touch signal indicating a sliding touch operation on the rotator adjusting control. For example, the slide operation may be a clockwise sliding touch operation or an anticlockwise sliding touch operation.

In step 204, the electronic device adjusts the shooting parameter according to the sliding touch signal.

In one exemplary embodiment, the electronic device increases a value of the shooting parameter if the sliding touch signal indicates a clockwise sliding touch operation, an increase of the value being in a positive correlation relationship to a length of a sliding path of the clockwise sliding touch operation.

Figure 2C:
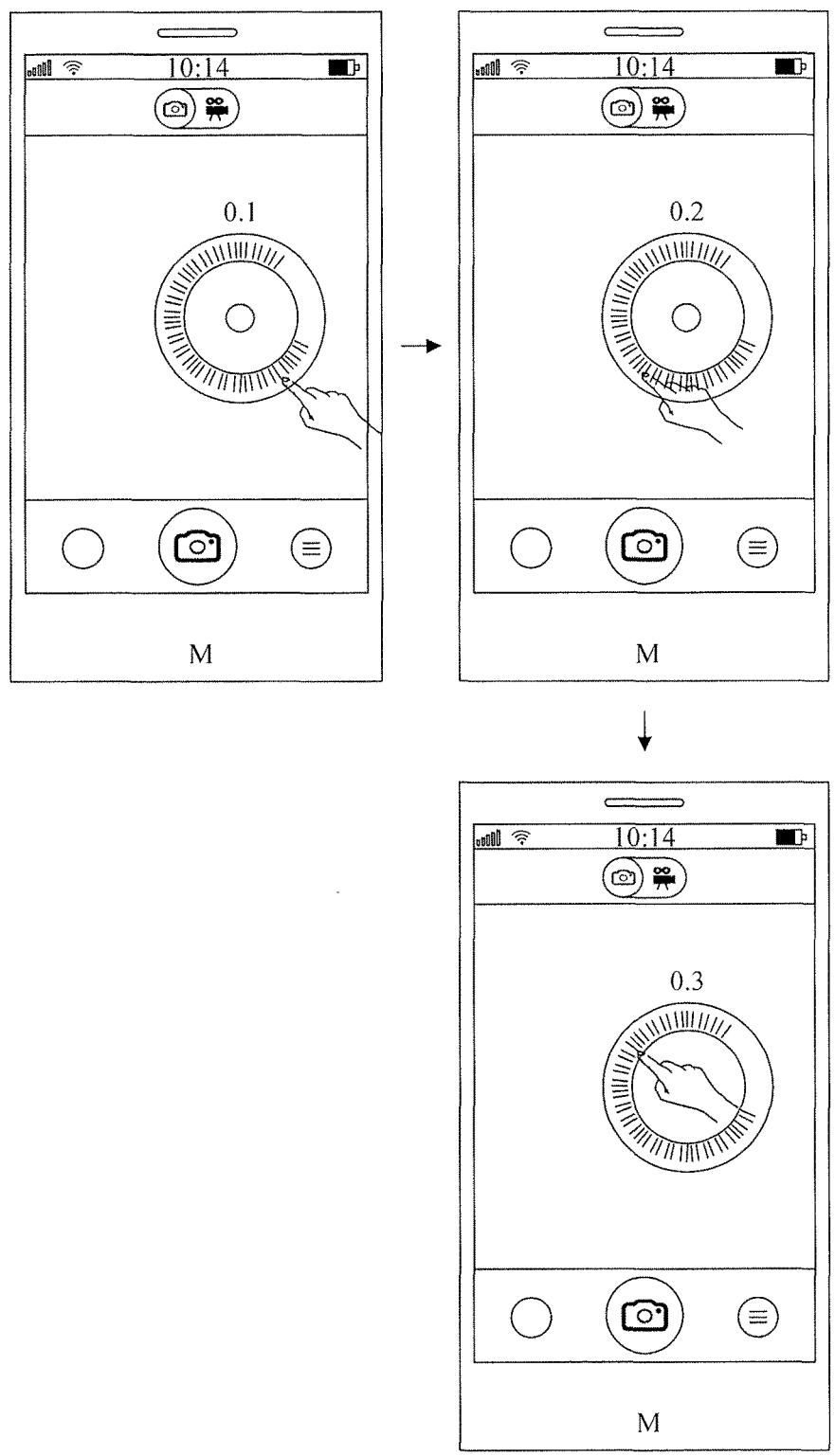
FIG. 2C shows schematic diagrams of a method for adjusting a shooting parameter according to a sliding touch signal, according to an exemplary embodiment.

For example, as shown in FIG. 2C, an exposure compensation value is increased by the electronic device if the sliding touch signal indicates a clockwise sliding touch operation. In the example, the exposure compensation value is increased from 0.1 to 0.2 if the sliding touch signal indicates that a length of a sliding path of the clockwise sliding touch operation is ¼ circle, and the exposure compensation value is increased from 0.1 to 0.3 if the sliding touch signal indicates that the length of the sliding path of the clockwise sliding touch operation is ½ circle.

In one exemplary embodiment, the electronic device decreases the value of the shooting parameter if the sliding touch signal indicates an anticlockwise sliding operation, a decrease of the value being in a positive correlation relationship to a length of a sliding path of the anticlockwise sliding touch operation.

Figure 2D:
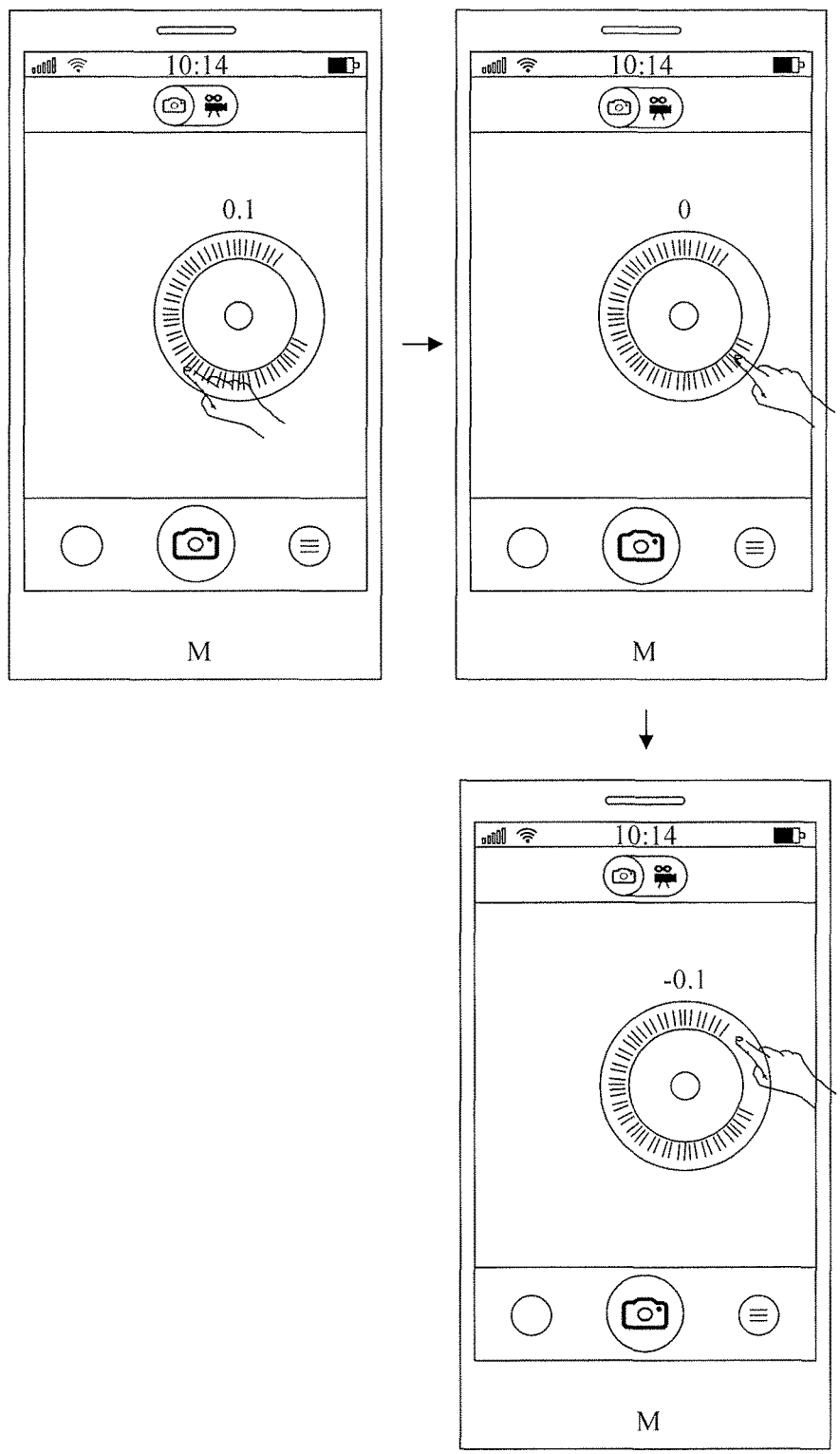
FIG. 2D shows schematic diagrams of a method for adjusting a shooting parameter according to a sliding touch signal, according to an exemplary embodiment.

For example, as shown in FIG. 2D, an exposure compensation value is decreased by the electronic device if the sliding touch signal indicates an anticlockwise sliding touch operation. In the example, the exposure compensation value is decreased from 0.1 to 0 if the sliding touch signal indicates that a length of a sliding path of the anticlockwise sliding touch operation is ¼ circle, and the exposure compensation value is decreased from 0.1 to −0.1 if the sliding touch signal indicates that the length of the sliding path of the anticlockwise sliding touch operation is ½ circle.

In exemplary embodiments, step 204 includes first and second substeps.

In the first substep, the electronic device detects whether a sliding velocity indicated by the sliding touch signal is in excess of a preset threshold value. For example, the sliding touch signal may indicate the sliding velocity of a clockwise sliding touch operation or an anticlockwise sliding touch operation.

In the second substep, the electronic device adjusts the shooting parameter to a default value if the sliding velocity indicated by the sliding touch signal is in excess of the preset threshold value. For example, the electronic device may reset the shooting parameter to the default value if the sliding velocity indicated by the sliding touch signal is in excess of the preset threshold value, such as resetting the exposure compensation value to a default value 0.

In step 205, the electronic device receives a shooting trigger signal. For example, after the adjustment of the shooting parameter, the electronic device receives the shooting trigger signal when, e.g., the user clicks on a shooting button in a user interface.

In step 206, the electronic device uses the adjusted shooting parameter for imaging, such as taking a picture or recording a video.

Figure 3A:
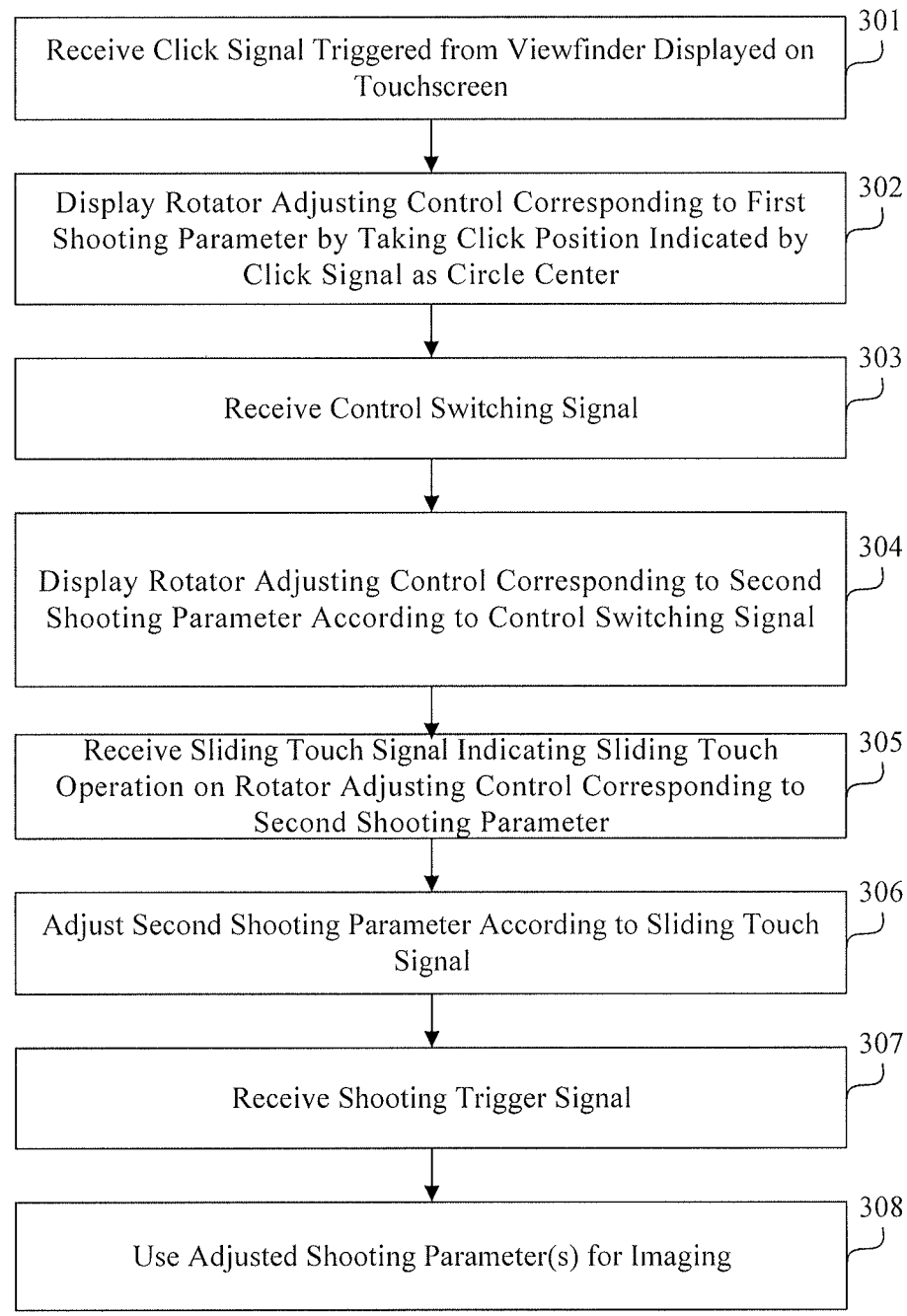
FIG. 3A is a flow chart of a shooting parameter adjustment method, according to an exemplary embodiment.

FIG. 3A is a flow chart of a shooting parameter adjustment method 300 for use in an electronic device, according to an exemplary embodiment. For example, the electronic device has a touchscreen and an imaging function such as taking pictures and/or recording videos. Referring to FIG. 3, the method 300 includes the following steps.

In step 301, the electronic device receives a click signal triggered from a viewfinder displayed on the touchscreen.

For example, when a user uses the electronic device to take a picture or record a video, the electronic device displays the viewfinder on the touchscreen for preview. The click signal is triggered when the user clicks on a position in the viewfinder displayed on the touchscreen. The electronic device may take the click position indicated by the click signal as a focus position, and perform automatic focusing.

In step 302, the electronic device displays a rotator adjusting control corresponding to a first shooting parameter by taking the click position indicated by the click signal as a circle center. For example, the rotator adjusting control may be displayed as an incomplete ring which includes a scale identification corresponding to the first shooting parameter and a name of the first shooting parameter.

Figure 3B:
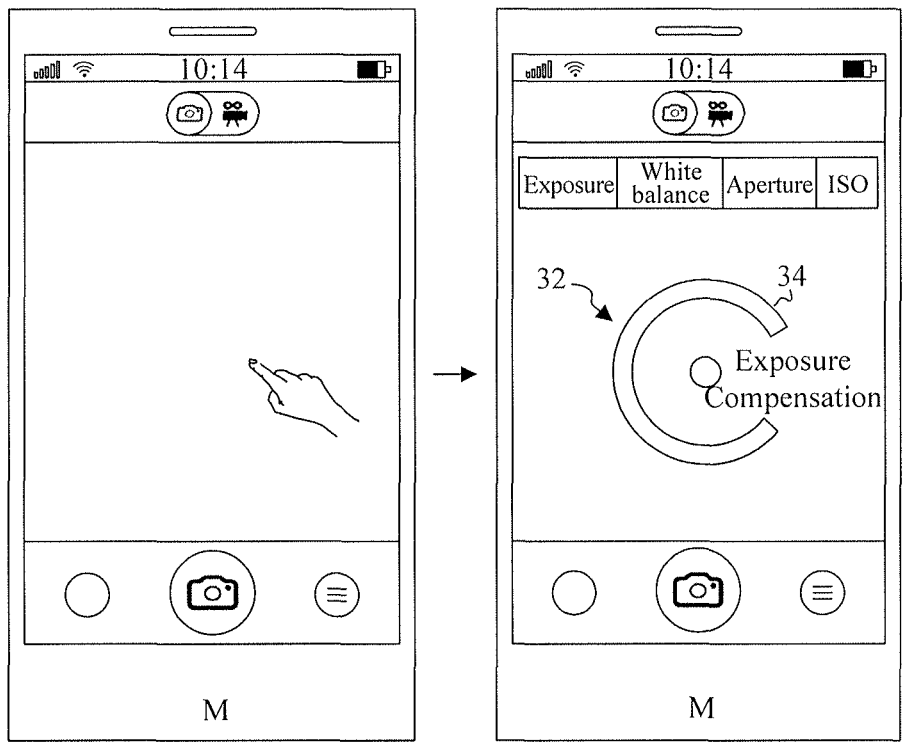
FIG. 3B is a schematic diagram of an interface for displaying a rotator adjusting control, according to an exemplary embodiment.

For example, as shown in FIG. 3B, the first shooting parameter may be an exposure compensation value, and a rotator adjusting control 32 is used to adjust the exposure compensation value. The rotator adjusting control 32 is displayed as an incomplete ring 34 with the name of the first shooting parameter "Exposure Compensation" displayed at the incomplete part.

In step 303, the electronic device receives a control switching signal. For example, if the rotator adjusting control currently displayed is not a control corresponding to a shooting parameter which the user wishes to adjust, the user may perform a switching operation, such as pressing a preset physical button, or pressing a virtual key displayed on the touchscreen, or performing a sliding touch operation in conformity with a predefined sliding path, or performing an operation sensed by a sensor in the electronic device. Accordingly, the electronic device receives the control switching signal indicating the switching operation.

Figure 3C:
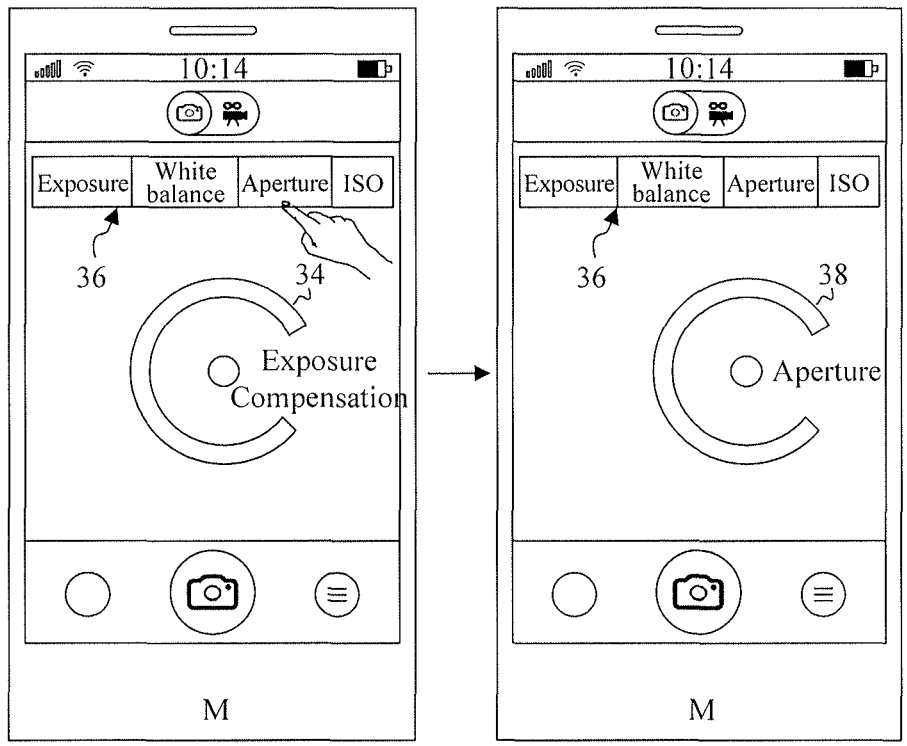
FIG. 3C shows schematic diagrams of an interface for switching display of a rotator adjusting control, according to an exemplary embodiment.

For example, as shown in FIG. 3C, the touchscreen of the electronic device displays a plurality of buttons 36 each corresponding to one shooting parameter. The electronic device may receive the control switching signal when the user clicks on one of the buttons 36, to select another shooting parameter different from that corresponding to the currently displayed adjusting control.

In step 304, the electronic device displays a rotator adjusting control corresponding to a second shooting parameter according to the control switching signal. Thus, the electronic device switches from displaying the rotator adjusting control corresponding to the first shooting parameter to displaying the rotator adjusting control corresponding to the second shooting parameter.

For example, as shown in FIG. 3C, if the user clicks on the "Aperture" button, the electronic device switches from displaying the rotator adjusting control 34 corresponding to the first shooting parameter exposure compensation to a rotator adjusting control 38 corresponding to the second shooting parameter aperture.

In step 305, the electronic device receives a sliding touch signal indicating a sliding touch operation on the rotator adjusting control corresponding to the second shooting parameter. For example, the slide operation may be a clockwise sliding touch operation or an anticlockwise sliding touch operation.

In step 306, the electronic device adjusts the second shooting parameter according to the sliding touch signal, similar to the above description in connection with step 204 (FIG. 2A).

Steps 303 through 306 may be repeated for any additional shooting parameters the user wishes to adjust.

In step 307, the electronic device receives a shooting trigger signal. For example, after the adjustment of the second shooting parameter and any additional shooting parameter, the electronic device receives the shooting trigger signal when, e.g., the user clicks on a shooting button in a user interface.

In step 308, the electronic device uses the adjusted shooting parameter(s) for imaging, such as taking a picture or recording a video.

Figure 4A:
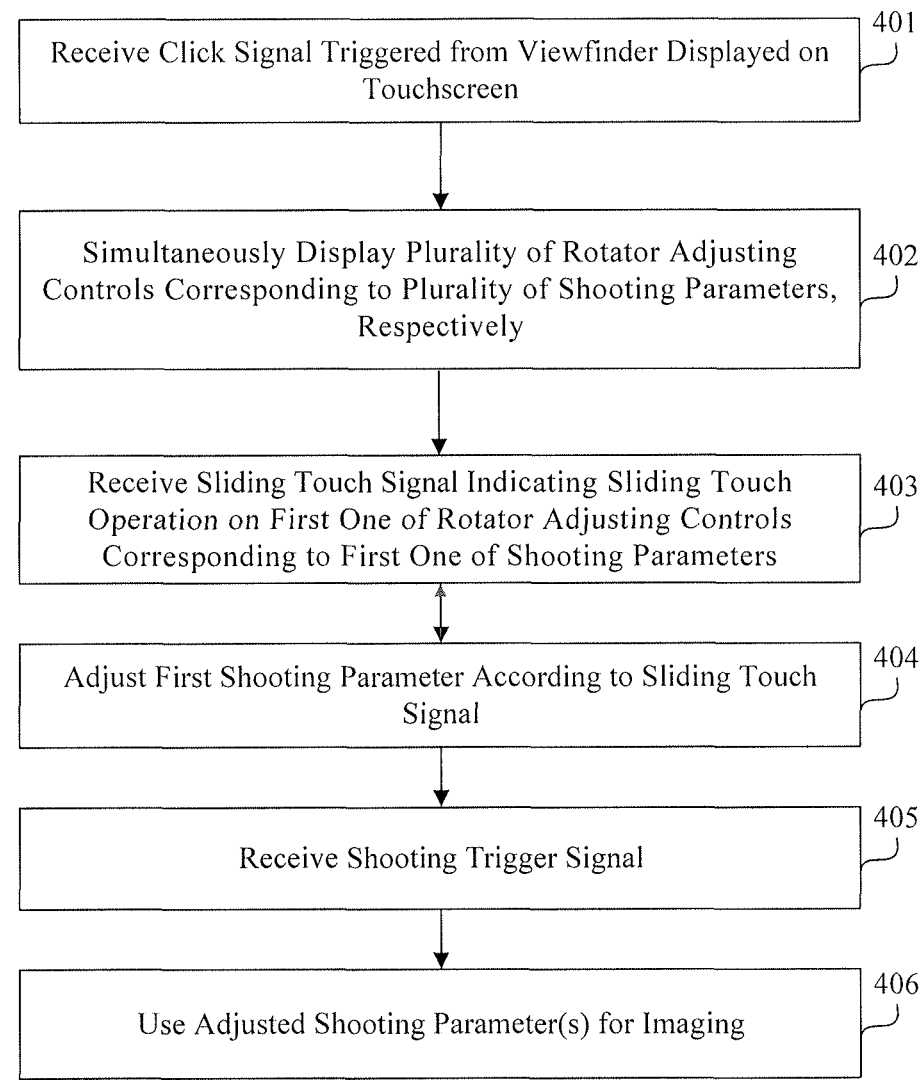
FIG. 4A is a flow chart of a shooting parameter adjustment method, according to an exemplary embodiment.

FIG. 4A is a flow chart of a shooting parameter adjustment method 400 for use in an electronic device, according to an exemplary embodiment. For example, the electronic device has a touchscreen and an imaging function such as taking pictures and/or recording videos. Referring to FIG. 4A, the method 400 includes following steps.

In step 401, the electronic device receives a click signal triggered from a viewfinder displayed on the touchscreen.

For example, when a user uses the electronic device to take a picture or record a video, the electronic device displays the viewfinder on the touchscreen for preview. The click signal is triggered when the user clicks on a position in the viewfinder displayed on the touchscreen. The electronic device may take the click position indicated by the click signal as a focus position, and perform automatic focusing.

In step 402, the electronic device simultaneously displays a plurality of rotator adjusting controls corresponding to a plurality of shooting parameters, respectively. For example, the electronic device simultaneously displays n rotator adjusting controls corresponding to n shooting parameters, respectively, by taking the click position of the click signal as a circle center. For example, the n rotator adjusting controls may each be displayed as one of a complete circle, an incomplete circle, a complete ring, and an incomplete ring.

Figure 4B:
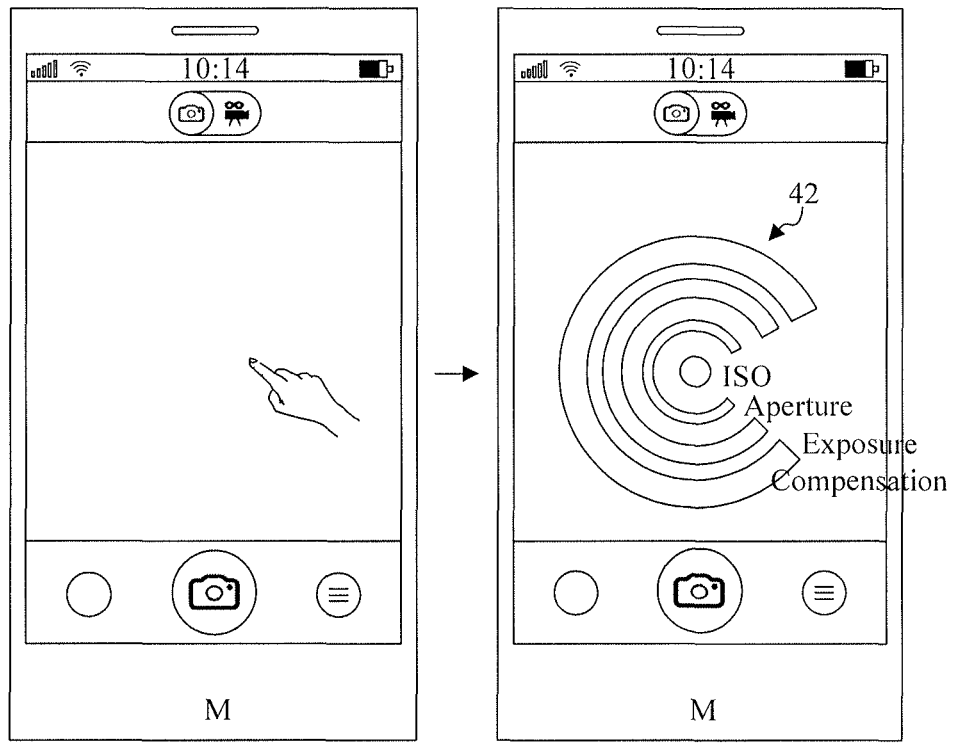
FIG. 4B is a schematic diagram of an interface for simultaneously displaying a plurality of rotator adjusting controls, according to an exemplary embodiment.

In one exemplary embodiment, the electronic device displays the n rotator adjusting controls as n concentric circles with the same circle center but different radiuses. For example, as shown in FIG. 4B, the electronic device displays three rotator adjusting controls 42 corresponding to three shooting parameters, and each of the rotator adjusting controls 42 is an incomplete ring. A first one of the rotator adjusting controls 42 with a minimum radius corresponds to the shooting parameter ISO, a second one of the rotator adjusting controls 42 with a medium radius corresponds to the shooting parameter aperture, and a third one of the rotator adjusting controls 42 with a maximum radius corresponds to the shooting parameter exposure compensation.

Figure 4C:
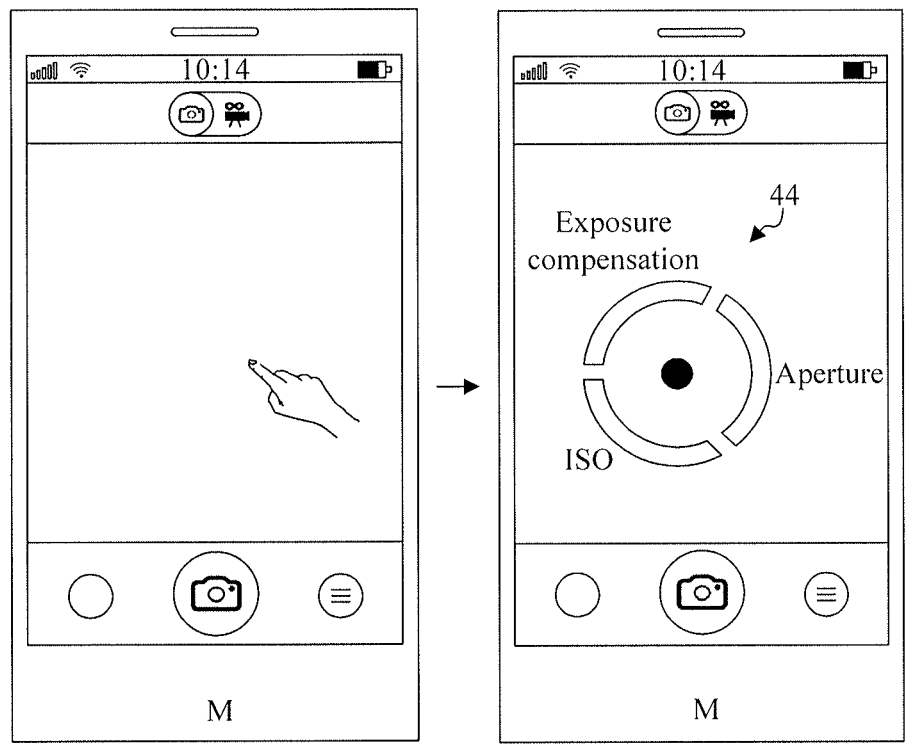
FIG. 4C is a schematic diagram of an interface for simultaneously displaying a plurality of rotator adjusting controls, according to an exemplary embodiment.

In one exemplary embodiment, the electronic device displays the n rotator adjusting controls at different arc positions on the same ring. For example, as shown in FIG. 4C, the electronic device displays three rotator adjusting controls 44 corresponding to three shooting parameters, respectively, at three different arc positions on the same ring, and each of the rotator adjusting controls 44 is an incomplete ring occupying one third of a complete ring. Also for example, a first one of the rotator adjusting controls 44 corresponds to the shooting parameter ISO, a second one the rotator adjusting controls 44 corresponds to the shooting parameter aperture, and a third one of rotator adjusting controls 44 corresponds to the shooting parameter exposure compensation.

In step 403, the electronic device receives a sliding touch signal indicating a sliding touch operation on a first one of the rotator adjusting controls corresponding to a first one of the shooting parameters. For example, the sliding touch operation may be a clockwise sliding touch operation or an anticlockwise sliding touch operation.

In step 404, the electronic device adjusts the first shooting parameter according to the sliding touch signal, similar to the above description in connection with step 204 (FIG. 2A).

Steps 403 and 404 may be repeated for any additional shooting parameter the user wishes to adjust.

In step 405, the electronic device receives a shooting trigger signal. For example, after the adjustment of the first shooting parameter and any additional shooting parameter, the electronic device receives the shooting trigger signal when, e.g., the user clicks on a shooting button in a user interface.

In step 406, the electronic device uses the adjusted shooting parameter(s) for imaging, such as taking a picture or recording a video.

In exemplary embodiments, after receiving the click signal, the electronic device uses a click position indicated by the click signal as a focus position for automatic focusing. After the automatic focusing, the electronic device may also change the display of an adjusting control, and the adjusting control after the change is configured to indicate completion of the automatic focusing. The change of the display may be changing a first element displayed at a central location of the adjusting control to a second element.

Figure 4D:
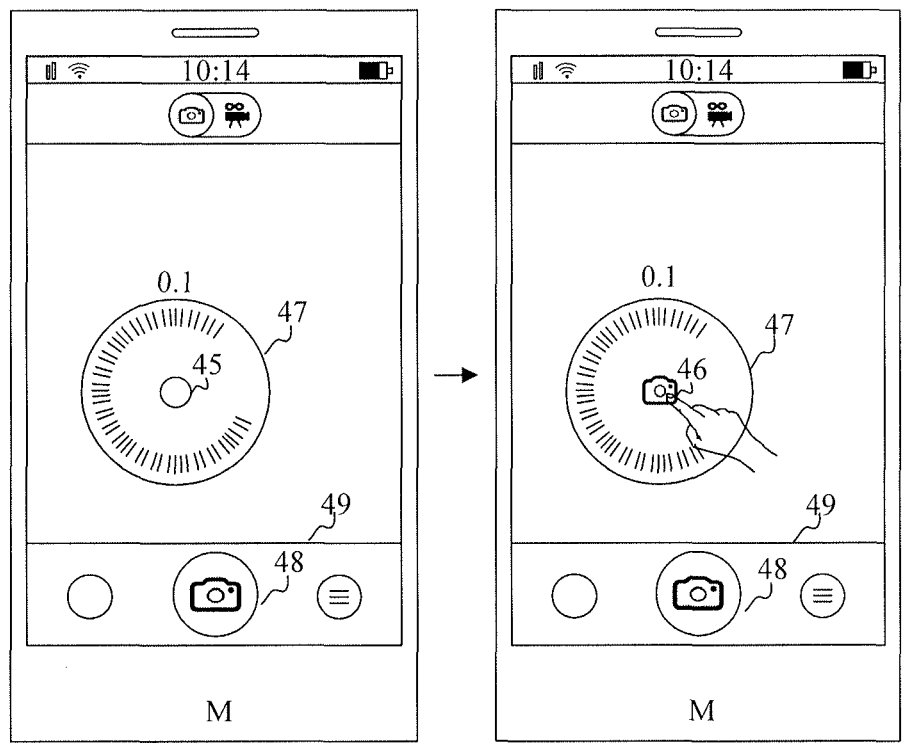
FIG. 4D shows schematic diagrams of an interface for displaying an adjusting control after automatic focusing, according to an exemplary embodiment.

For example, as shown in FIG. 4D, after completion of the automatic focusing, the electronic device changes the display of a circle 45 displayed in a central location of an adjusting control 47 to a camera button 46, thus indicating completion of the automatic focusing. Hereafter, the user may adjust a shooting parameter using the adjusting control 47.

In exemplary embodiments, the user may trigger shooting by clicking on a shooting button 48 at the bottom of a user interface 49, or trigger shooting by clicking on the adjusting control 47. For example, the user may trigger shooting by clicking on the camera button 46 on the adjusting control 47.

Figure 4E:
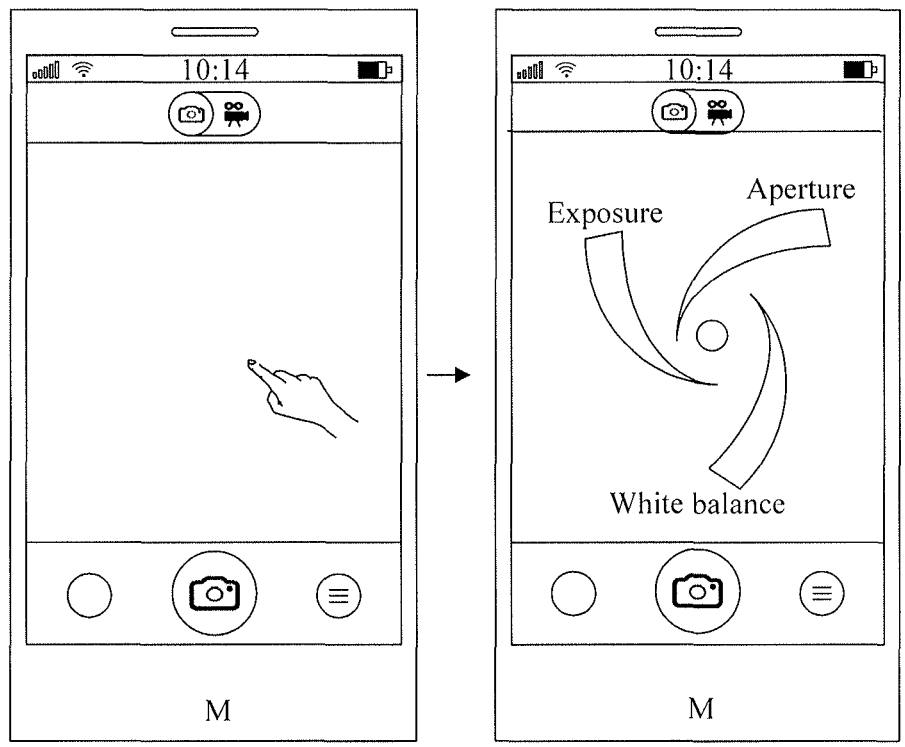
FIG. 4E is a schematic diagram of a plurality of adjusting controls, according to an exemplary embodiment.
Figure 4F:
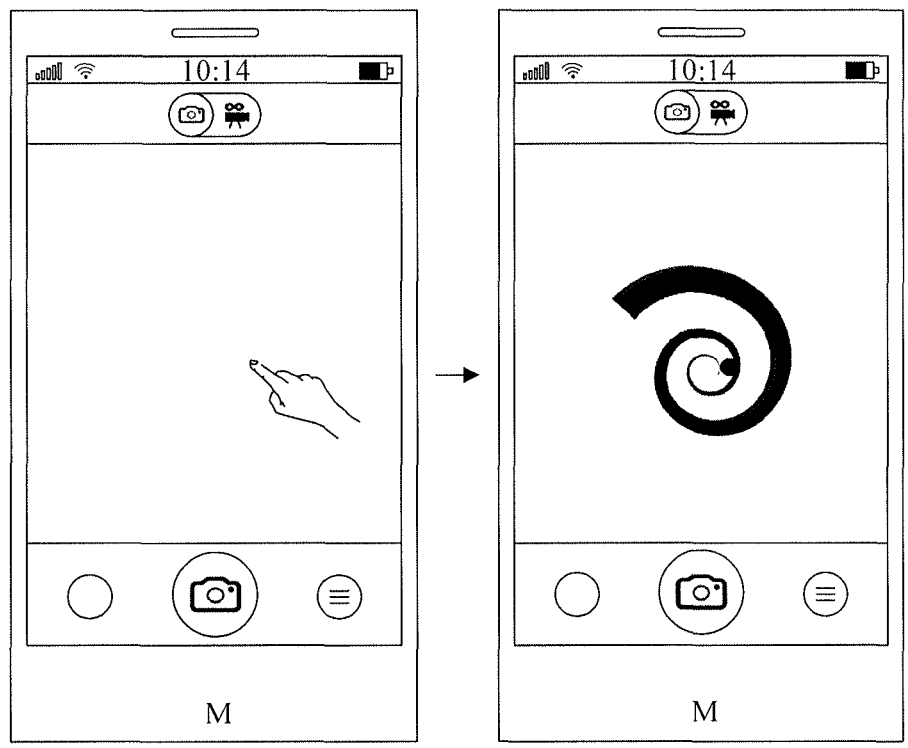
FIG. 4F is a schematic diagram of a plurality of adjusting controls, according to an exemplary embodiment.

It should also be noted that the display shape of an adjusting control is not restricted. For example, the adjusting control may also be displayed as an arc shown in FIG. 4E, a helical line shown in FIG. 4F, or any other shape.

Figure 5:
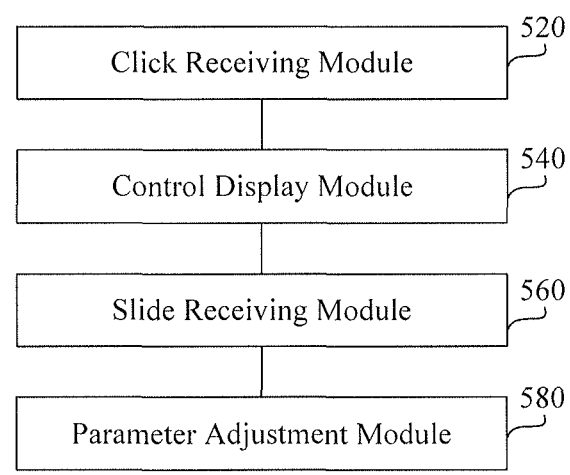
FIG. 5 is a block diagram of a shooting parameter adjustment device, according to an exemplary embodiment.

FIG. 5 is a block diagram of a shooting parameter adjustment device 500, according to an exemplary embodiment. For example, the device 500 may be a part of an electronic device or the whole electronic device by means of software, hardware, or a combination of both. Referring to FIG. 5, the device 500 includes a click receiving module 520 configured to receive a click signal triggered from a viewfinder displayed on a touchscreen; a control display module 540 configured to display, by taking a click position indicated by the click signal as a reference position, an adjusting control corresponding to a shooting parameter; a slide receiving module 560 configured to receive a sliding touch signal indicating a sliding touch operation on the adjusting control; and a parameter adjustment module 580 configured to adjust the shooting parameter according to the sliding touch signal.

Figure 6:
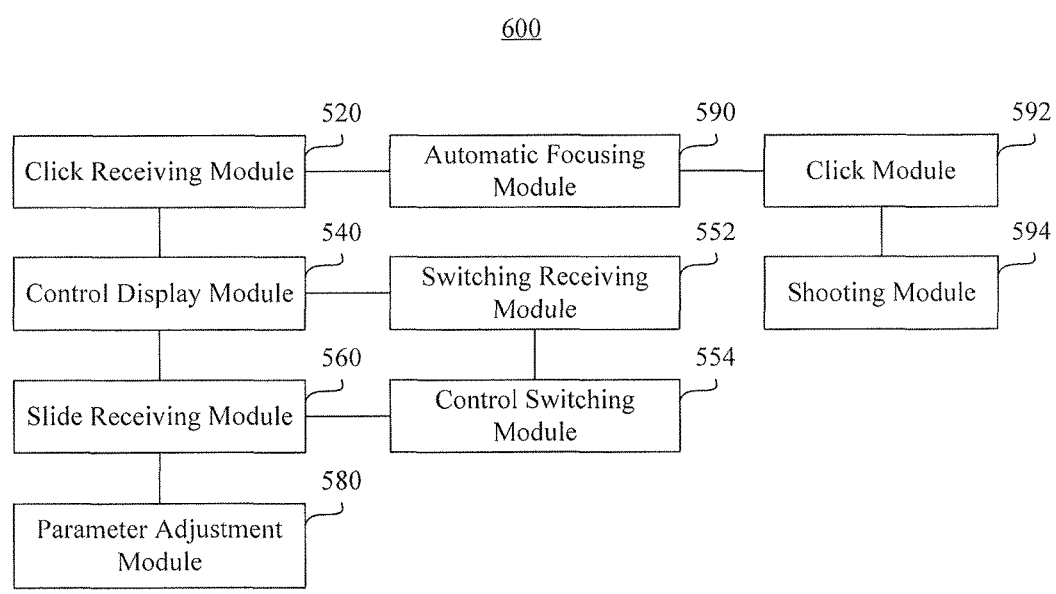
FIG. 6 is a block diagram of a shooting parameter adjustment device, according to an exemplary embodiment.

FIG. 6 is a block diagram of a shooting parameter adjustment device 600, according to an exemplary embodiment. For example, the device 600 may be a part of an electronic device or the whole electronic device by means of software, hardware, or a combination of both. Referring to FIG. 6, the device 600 may include the click receiving module 520, the control display module 540, the slide receiving module 560, and the parameter adjustment module 580 (FIG. 5).

In exemplary embodiments, the control display module 540 is further configured to display, by taking the click position indicated by the click signal as a circle center, a rotator adjusting control corresponding to a shooting parameter. A display shape of the rotator adjusting control may be any one of a complete circle, an incomplete circle, a complete ring, and an incomplete ring.

In exemplary embodiments, the device 600 also includes a switching receiving module 552 configured to receive a control switching signal; and a control switching module 554 configured to switch, according to the control switching signal, from displaying a first rotator adjusting control corresponding to a first shooting parameter to a second rotator adjusting control corresponding to a second shooting parameter.

In exemplary embodiments, the device 600 also includes an automatic focusing module 590 configured to perform automatic focusing by taking the click position indicated by the click signal as a focus position.

In exemplary embodiments, the device 600 also includes a click module 592 configured to receive, after completion of automatic focusing by the automatic focusing module 590, a click signal indicating a shooting operation; and a shooting module 594 configured to conduct a shooting after the click signal is received by the click module 592.

Figure 7:
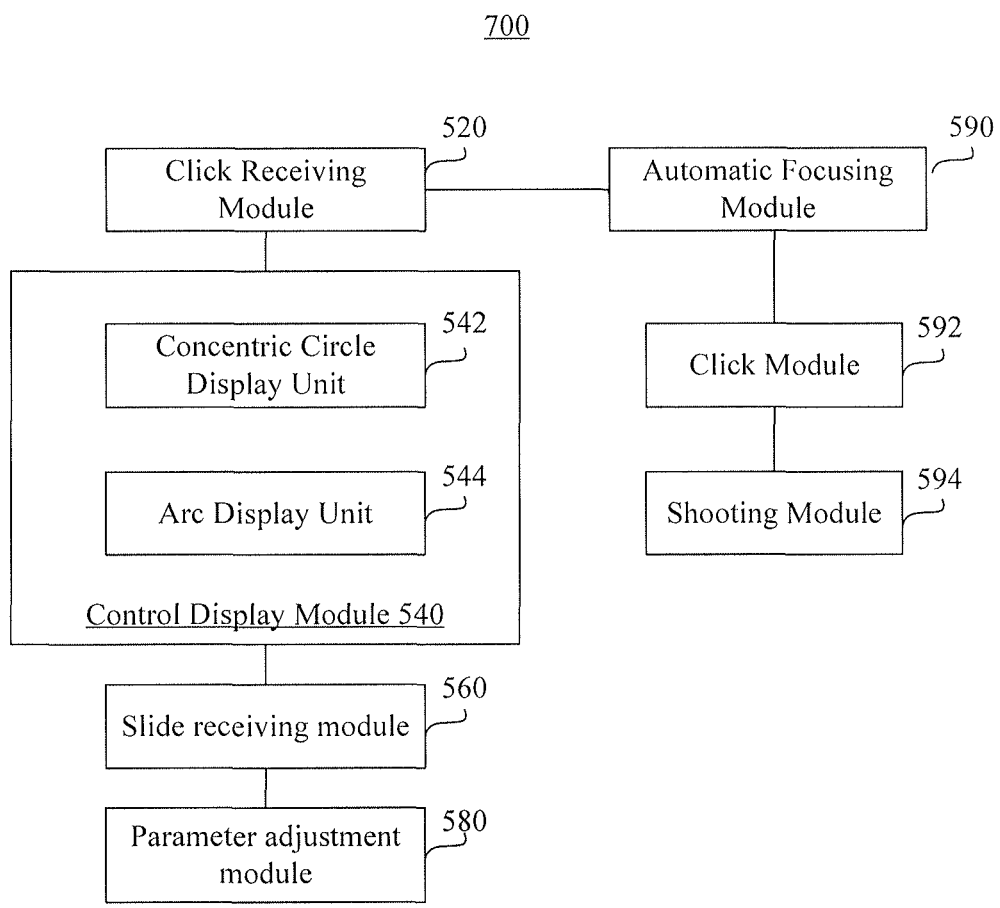
FIG. 7 is a block diagram of a shooting parameter adjustment device, according to an exemplary embodiment.

FIG. 7 is a block diagram of a shooting parameter adjustment device 700, according to an exemplary embodiment. For example, the device 700 may be a part of an electronic device or the whole electronic device by means of software, hardware, or a combination of both. Referring to FIG. 7, the device 700 includes the click receiving module 520, the control display module 540, the slide receiving module 560, and the parameter adjustment module 580 (FIG. 5).

In exemplary embodiments, the control display module 540 is configured to display n (n≥2) rotator adjusting controls corresponding to n shooting parameters, respectively, by taking a click position indicated by a click signal as a circle center. A display shape of each rotator adjusting control may be any one of a complete circle, an incomplete circle, a complete ring and an incomplete ring.

In exemplary embodiments, the control display module 540 includes a concentric circle display unit 542 and an arc display unit 544. The concentric circle display unit 542 is configured to display the n rotator adjusting controls in the shape of concentric circles with the same circle center but different radiuses. The arc display unit 544 is configured to display the n rotator adjusting controls at different positions of the same ring. Accordingly, the display shape of each of the n rotator adjusting controls is an incomplete circle or an incomplete ring.

In exemplary embodiments, the device 700 also includes the automatic focusing module 590, the click module 592, and the shooting module 594 (FIG. 6).

Operations of all of the above modules are also described in the embodiments of the methods.

Figure 8:
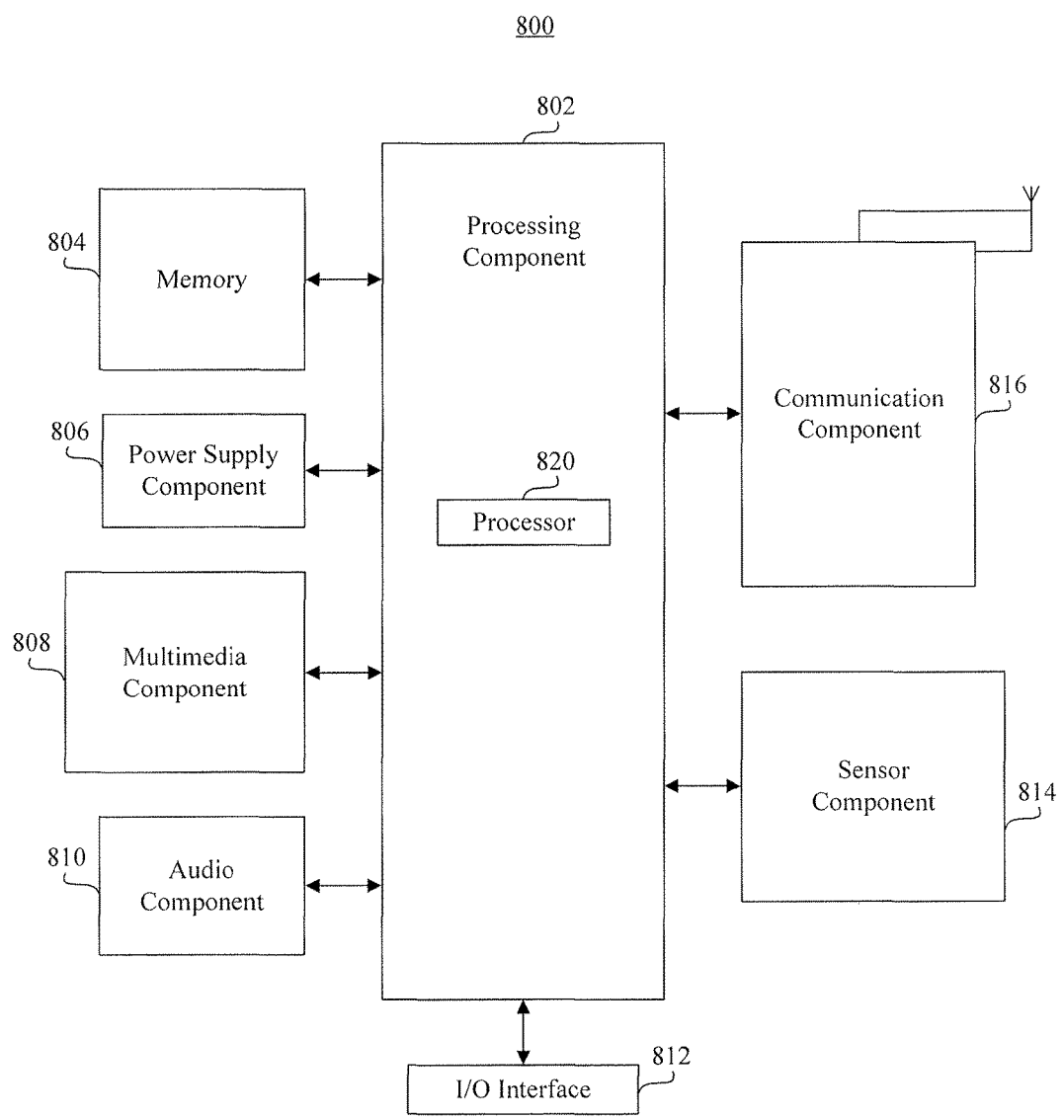
FIG. 8 is a block diagram of an electronic device, according to an exemplary embodiment.

FIG. 8 is a block diagram of a device 800, according to an exemplary embodiment. For example, the device 800 may be a mobile telephone, a computer, a digital broadcasting terminal, a message transceiver device, a games console, a tablet device, a medical device, a fitness facility, a personal digital assistant (PDA) and the like.

Referring to FIG. 8, the device 800 may include one or more of the following components: a processor component 802, a memory 804, a power supply component 806, a multimedia component 808, an audio component 810, an input/output (I/O) interface 812, a sensor component 814, and a communication component 816.

The processor component 802 usually controls the overall operation of the device 800, for example, display, telephone call, data communication, and operation associated with camera operation and record operation. The processor component 802 may include one or more processors 820 for executing instructions so as to perform the above described methods in part or in whole. In addition, the processor component 802 may include one or more modules for the convenience of interaction between the processor component 802 and other components. For example, the processor component 802 may include a multimedia module for the convenience of interaction between the multimedia component 808 and the processor component 802.

The memory 804 is configured to store data of different types so as to support the operation of the device 800. Examples of the data include any application program or approach directive for operation of the device 800, including contact data, phonebook data, message, picture and video, etc. The memory 804 may be realized by a volatile or non-volatile memory device of any type or combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk or optical disk.

The power supply component 806 provides power for components of the device 800. The power supply component 806 may include a power management system, one or a plurality of power supplies, and other components associated with generation, management and power distribution of the device 800.

The multimedia component 808 includes a screen between the device 800 and a user and for providing an output interface. In some embodiments, the screen may include an liquid crystal display (LCD) and a touch panel (TP). If the screen includes a touch panel, the screen may be realized as a touch screen for receiving input signal from users. The touch panel includes one or a plurality of touch sensors for sensing gestures on the touch panel, for example, touching and sliding, etc. The touch sensor not only can sensor a boundary of touching or sliding, but also can detect the duration and pressure related to the touching or sliding operation. In some embodiments, the multimedia component 808 includes a front-facing camera and/or a rear-facing camera. When the device 800 is under an operation mode, for example, capture mode or video mode, the front-facing camera and/or the rear-facing camera may receive external multimedia data. Each front-facing camera and rear-facing camera may be a fixed optical lens system or have focal length and optical zoom capacity.

The audio component 810 is configured to output and/or input audio signals. For example, the audio component 810 includes a microphone. When the device 800 is under an operation mode such as call mode, record mode and speech recognition mode, the microphone is configured to receive external audio signal. The audio signal received may be further stored in the memory 804 or sent out by the communication component 816. In some embodiments, the audio component 810 also includes a loudspeaker for outputting audio signal.

The I/O interface 812 provides an interface for the processor component 802 and peripheral interface modules. The peripheral interface modules may be a keyboard, a click wheel and buttons, etc. These buttons may include but not limited to: home button, volume button, start button and locking button.

The sensor component 814 includes one or more sensors for providing the device 800 with state evaluation from all aspects. For example, the sensor component 814 may detect the on/off state of the device 800, relative positioning of components, for example, the components are the displayer and keypads of the device 800; the sensor component 814 also may detect the position change of the device 800 or a component thereof, the presence or absence of users' touch on the device 800, the direction or acceleration/deceleration of the device 800, and temperature variation of the device 800. The sensor component 814 may also include a proximity detector, which is configured to detect the presence of nearby objects in case of no physical touch. The sensor component 814 may also include an optical sensor, for example, CMOS or CCD image sensor for imaging. In some embodiments, the sensor component 814 may also include an acceleration sensor, a gyro sensor, a magnetic sensor, a pressure sensor, or a temperature sensor.

The communication component 816 is configured to facilitate wired communication or wireless communication between the device 800 and other equipment. The device 800 is available for access to wireless network based on communication standards, for example, WiFi, 2G or 3G, or combination thereof. In an exemplary embodiment, the communication component 816 receives by means of a broadcast channel a broadcast signal or broadcast-related information from external broadcast management systems. In an exemplary embodiment, the communication component 816 also includes a near field communication (NFC) module for promoting short-range communication. For example, the NFC module may be realized on the basis of Radio Frequency Identification (RFID) technology, Infrared Data Association (IrDA) technology, Ultra-wide Bandwidth (UWB) technology, Bluetooth (BT) technology and other technologies.

In exemplary embodiments, the device 800 may be realized by one or more application specific integrated circuits (ASICs), digital signal processors (DSPs), digital signal processing devices (DSPDs), programmable logic devices (PLDs), field programmable gate arrays (FPGAs), controllers, microcontrollers, or other electronic components, configured to perform the above described methods.

In exemplary embodiments, there is also provided a non-transitory computer-readable storage medium storing instructions, such as included in the memory 804, executable by the processors 820 of the device 800, for performing the above described methods. For example, the non-transitory computer-readable storage medium may be a read-only memory (ROM), a random access memory (RAM), a CD-ROM, a magnetic tape, a floppy disk, an optical data storage device, etc.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a device to adjust a shooting parameter, comprising:
    receiving a click signal triggered from a viewfinder displayed on a touchscreen;
    displaying, by taking a click position indicated by the click signal as a reference position, an adjusting control corresponding to a shooting parameter;
    receiving a sliding touch signal indicating a sliding touch operation on the adjusting control; and
    adjusting the shooting parameter according to the sliding touch signal,
    wherein the displaying of the adjusting control includes displaying, by taking the click position indicated by the click signal as a circle center, a rotator adjusting control corresponding to the shooting parameter, a display shape of the rotator adjusting control being one of a complete circle, an incomplete circle, a complete ring, and an incomplete ring; and
    wherein the adjusting of the shooting parameter includes detecting whether a sliding velocity indicated by the sliding touch signal is in excess of a preset threshold value, and adjusting the shooting parameter to a default value if the sliding velocity indicated by the sliding touch signal is in excess of the preset threshold value.

2. The method of claim 1, further comprising:
    receiving a control switching signal indicating a switching operation from the shooting parameter, as a first shooting parameter, to a second shooting parameter; and
    switching, according to the control switching signal, from displaying the rotator adjusting control corresponding to the first shooting parameter to displaying a rotator adjusting control corresponding to the second shooting parameter.

3. The method of claim 1, wherein the displaying of the adjusting control comprises:
    displaying a plurality of rotator adjusting controls corresponding to a plurality of shooting parameters, respectively, by taking the click position indicated by the click signal as a circle center, a display shape of each of the rotator adjusting controls being one of a complete circle, an incomplete circle, a complete ring, and an incomplete ring.

4. The method of claim 3, wherein the displaying of the plurality of rotator adjusting controls comprises:
    displaying the plurality of rotator adjusting controls in concentric circles with the same circle center but different radiuses.

5. The method of claim 3, wherein the displaying of the plurality of rotator adjusting controls comprises:
    displaying the plurality of rotator adjusting controls at different arc positions on a same ring corresponding to the circle center.

6. The method of claim 1, wherein the adjusting of the shooting parameter comprises:
    increasing a value of the shooting parameter if the sliding touch signal indicates a clockwise sliding touch operation, an increase of the value of the shooting parameter being in a positive correlation relationship to a length of a sliding path of the clockwise sliding touch operation; and
    decreasing the value of the shooting parameter if the sliding touch signal indicates an anticlockwise sliding touch operation, a decrease of the value of the shooting parameter being in a positive correlation relationship to a length of a sliding path of the anticlockwise sliding operation.

7. The method of claim 1, wherein the adjusting of the shooting parameter comprises:
    decreasing a value of the shooting parameter if the sliding touch signal indicates a clockwise sliding touch operation, a decrease of the value of the shooting parameter being in a positive correlation relationship to a length of a sliding path of the clockwise sliding touch operation; and
    increasing the value of the shooting parameter if the sliding touch signal indicates an anticlockwise sliding touch operation, an increase of the value of the shooting parameter being in a positive correlation relationship to a length of a sliding path of the anticlockwise sliding touch operation.

8. The method of claim 1, wherein the displaying of the rotator adjusting control comprises:
displaying a scale identification corresponding to the shooting parameter.

9. The method of claim 1, wherein the displaying of the adjusting control comprises:
displaying the adjusting control corresponding to one of an exposure compensation value, a white balance value, an International Standards Organization (ISO) setting, an aperture value, a focal length, and a shutter speed.

10. The method according to claim 1, further comprising:
performing automatic focusing by taking the click position indicated by the click signal as a focus position.

11. The method of claim 10, further comprising:
receiving, after completion of the automatic focusing, a click signal indicating a click on the adjusting control; and
using the adjusted shooting parameter for imaging, after receiving the click signal.

12. A device, comprising:
a processor;
a touchscreen; and
a memory for storing instructions executed by the processor;
wherein the processor is configured to:
receive a click signal triggered from a viewfinder displayed on a touchscreen;
display, by taking a click position indicated by the click signal as a reference position, an adjusting control corresponding to a shooting parameter;
receive a sliding touch signal indicating a sliding touch operation on the adjusting control; and
adjust the shooting parameter according to the sliding touch signal,
wherein, in displaying the adjusting control includes, the processor is further configured to display, by taking the click position indicated by the click signal as a circle center, a rotator adjusting control corresponding to the shooting parameter, a display shape of the rotator adjusting control being one of a complete circle, an incomplete circle, a complete ring, and an incomplete ring; and
wherein, in adjusting the shooting parameter, the processor is further configured to detect whether a sliding velocity indicated by the sliding touch signal is in excess of a preset threshold value, and adjust the shooting parameter to a default value if the sliding velocity indicated by the sliding touch signal is in excess of the preset threshold value.

13. The device of claim 12, wherein the processor is further configured to:
receive a control switching signal indicating a switching operation from the shooting parameter, as a first shooting parameter, to a second shooting parameter; and
switch, according to the control switching signal, from displaying the rotator adjusting control corresponding to the first shooting parameter to displaying a rotator adjusting control corresponding to the second shooting parameter.

14. The device of claim 12, wherein the processor is further configured to:
display a plurality of rotator adjusting controls corresponding to a plurality of shooting parameters, respectively, by taking the click position indicated by the click signal as a circle center, a display shape of each of the rotator adjusting controls being one of a complete circle, an incomplete circle, a complete ring, and an incomplete ring.

15. The device of claim 14, wherein the processor is further configured to:
display the plurality of rotator adjusting controls in concentric circles with the same circle center but different radiuses.

16. The device of claim 14, wherein the processor is further configured to:
display the plurality of rotator adjusting controls at different arc positions on a same ring corresponding to the circle center.

17. A non-transitory computer-readable storage medium having stored therein instructions that, when executed by a processor of a device, cause the device to perform a method for adjusting a shooting parameter, the method comprising:
receiving a click signal triggered from a viewfinder displayed on a touchscreen;
displaying, by taking a click position indicated by the click signal as a reference position, an adjusting control corresponding to a shooting parameter;
receiving a sliding touch signal indicating a sliding touch operation on the adjusting control; and
adjusting the shooting parameter according to the sliding touch signal,
wherein the displaying of the adjusting control includes displaying, by taking the click position indicated by the click signal as a circle center, a rotator adjusting control corresponding to the shooting parameter, a display shape of the rotator adjusting control being one of a complete circle, an incomplete circle, a complete ring, and an incomplete ring; and
wherein the adjusting of the shooting parameter includes detecting whether a sliding velocity indicated by the sliding touch signal is in excess of a preset threshold value, and adjusting the shooting parameter to a default value if the sliding velocity indicated by the sliding touch signal is in excess of the preset threshold value.

* * * * *